United States Patent
Neal et al.

(10) Patent No.: US 6,819,413 B2
(45) Date of Patent: Nov. 16, 2004

(54) METHOD AND SYSTEM FOR SENSING AND ANALYZING A WAVEFRONT OF AN OPTICALLY TRANSMISSIVE SYSTEM

(75) Inventors: Daniel R. Neal, Tueras, NM (US); Richard J. Copland, Albuquerque, NM (US); Ron R. Rammage, Tueras, NM (US); Daniel M. Topa, Albuquerque, NM (US); Daniel R. Hamrick, Cedar Crest, NM (US)

(73) Assignee: Wavefront Sciences, Inc., Albuquerque, NM (US)

( * ) Notice: Subject to any disclaimer, the term of this patent is extended or adjusted under 35 U.S.C. 154(b) by 0 days.

(21) Appl. No.: 10/650,666

(22) Filed: Aug. 29, 2003

(65) Prior Publication Data

US 2004/0041978 A1 Mar. 4, 2004

Related U.S. Application Data

(63) Continuation of application No. PCT/US03/16972, filed on May 30, 2003.
(60) Provisional application No. 60/384,082, filed on May 31, 2002.

(51) Int. Cl.[7] .............................. G01J 1/00; G01B 9/00
(52) U.S. Cl. ..................... 356/123; 356/125; 359/641; 351/205
(58) Field of Search ............................. 356/200, 205, 356/123–125; 359/436, 440, 441, 442, 641

(56) References Cited

U.S. PATENT DOCUMENTS

| 5,289,254 A | 2/1994 | Braunecker et al. |
| 5,629,765 A | 5/1997 | Schmutz |
| 5,825,476 A | 10/1998 | Abitol et al. |
| 5,841,125 A | 11/1998 | Livingston |
| 5,978,053 A | 11/1999 | Giles et al. |
| 6,382,795 B1 * | 5/2002 | Lai ............................ 351/212 |
| 6,525,883 B2 * | 2/2003 | Hirohara et al. ............ 351/212 |
| 6,536,900 B2 * | 3/2003 | Mihashi et al. ............. 351/221 |
| 6,550,917 B1 | 4/2003 | Neal et al. |
| 6,575,572 B2 | 6/2003 | Lai et al. |

OTHER PUBLICATIONS

Roggemann, Michael C. and Schulz, Timothy J., "Algorithm to Increase the largest aberration that can be reconstructed from Hartmann sensor measurements," vol. 37, No. 20, Applied Optics, Jul. 10, 1998, pp. 4321–4329.

Southwell, W.H., "Wave–front estimation from wave–front slope measurements," J. Opt. Soc. Am., vol. 70, No. 8, Aug. 1980, pp. 998–1006.

Pernick, Benjamin J., and Hyman, Barry, "Least–squares technique for determining principle plane location and focal length," Applied Optics, vol. 26, No. 15, Aug. 1987, pp. 2938–2839

\* cited by examiner

Primary Examiner—Brian L. Casler
Assistant Examiner—John R. Sanders
(74) Attorney, Agent, or Firm—Volentine Francos & Whitt, PLLC

(57) ABSTRACT

An enhanced dynamic range wavefront sensing system includes a light source disposed on a first side of an optically transmissive device, a wavefront sensor disposed on a second side of an optically transmissive device, a relay imaging system disposed between the optically transmissive device and the wavefront sensor, and means for adjusting a distance between the light source and the optically transmissive device. Beneficially, the relay imaging system includes a range-limiting aperture to insure that the wavefront sensor never goes out of range so that a feedback system can be employed to move the light source one focal length away from the optically transmissive device.

33 Claims, 7 Drawing Sheets

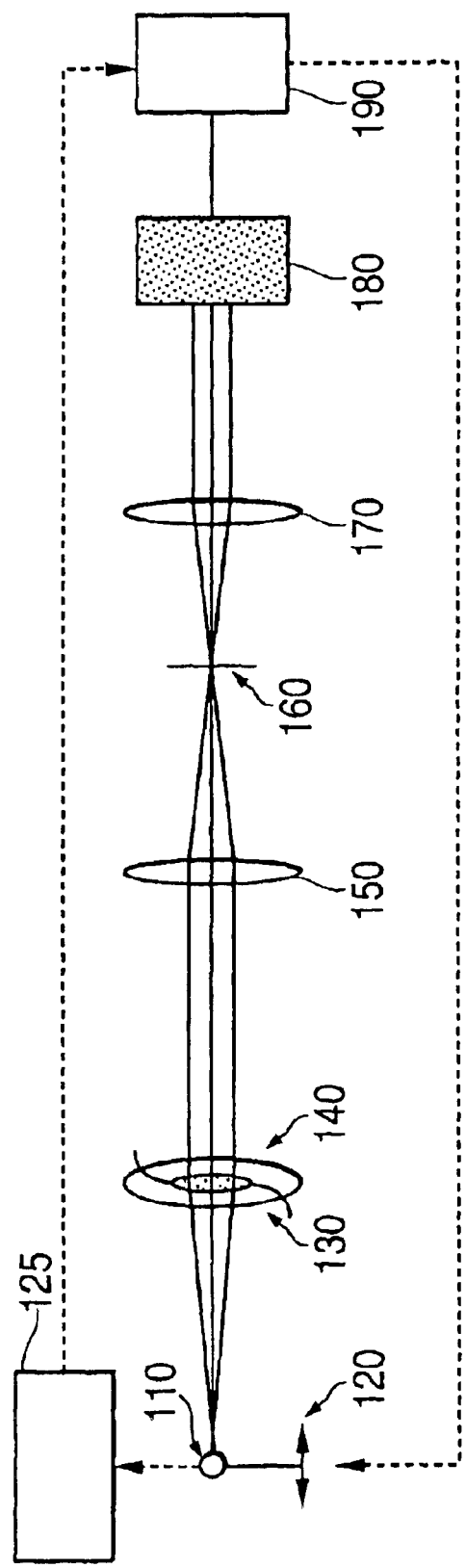

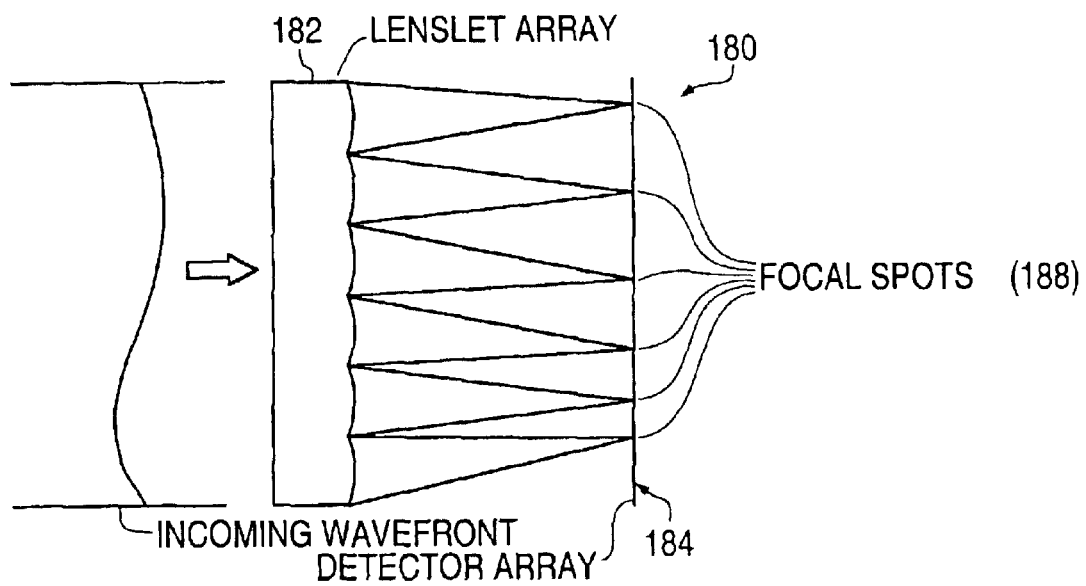
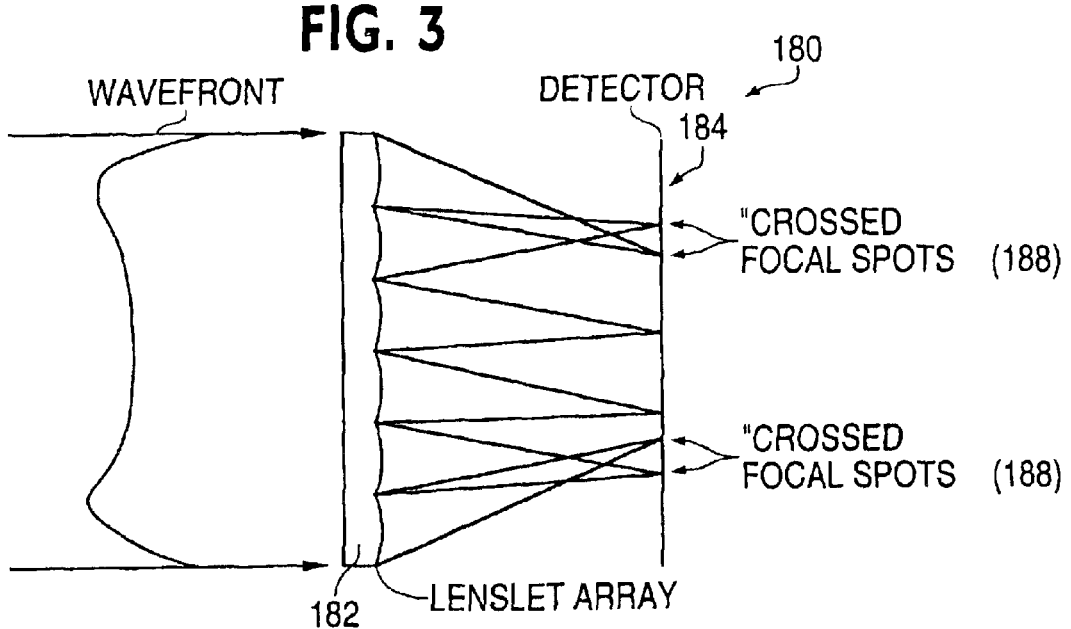

METHOD AND SYSTEM FOR SENSING AND ANALYZING A WAVEFRONT OF AN OPTICALLY TRANSMISSIVE SYSTEM

CROSS REFERENCES TO RELATED APPLICATIONS

This application is a continuation of International Patent Application No. PCT/US03/16972 filed on 30 May 2003, claiming the priority benefit under 35 U.S.C. §119(e) from U.S. Provisional Patent Application No. 60/384,082 filed on May 31, 2002, the entirety of each of which is hereby incorporated by reference for all purposes as if fully set forth herein.

BACKGROUND AND SUMMARY OF THE INVENTION

1. Technical Field

This invention pertains to the field of wavefront sensing methods and devices, and more particularly, wavefront sensing methods and devices used to measure the optical quality of an optically transmissive system or device, for example, an optical component such as a lens.

2. Description

A light wavefront may be defined as the virtual surface delimited by all possible rays having an equal optical path length from a spatially coherent source. For example, the wavefront of light emanating from a point light source is a sphere (or a partial sphere where light from the point light source is limited to emission along a small range of angles). Meanwhile, the wavefront created by a collimating lens mounted at a location one focal length away from a point source is a plane. A wavefront may be planar, spherical, or have some arbitrary shape dictated by other elements of an optical system through which the light is transmitted or reflected.

A wavefront analysis system, including a wavefront sensor, may be used to measure characteristics of an optically transmissive system by detecting the wavefront of light emerging from the system and comparing it to some expected ideal wavefront (planar, spherical, etc.). The optically transmissive system might be a single component or may be very complex, such as a transmissive optics system, (e.g., a collimating lens; ophthalmic lens). The differences between the ideal expected wavefront and the actual measured wavefront are caused by optical aberrations of the system under test (SUT).

A number of different wavefront sensors and associated methods are known. Among these are interferometers and the Shack-Hartmann wavefront sensor. Each of these systems will be described briefly below. A more detailed discussion of wavefront sensing techniques may be found in "Introduction to Wavefront Sensors," 1995, Joseph M. Geary, SPIE Press.

Interferometers

An interferometer is an instrument that uses interference of light waves to detect the relative wavefront difference between a test light beam and a reference beam. Interferometric methods of sensing a wavefront are highly sensitive but very limited in dynamic range. A typical interferometer can only directly measure optical path differences of less than one wavelength—a $2\pi$ phase ambiguity exists beyond the one wavelength point. If the optical path difference is greater than one wavelength, then the correct phase difference is often inferred computationally using phase unwrapping techniques. However, real optical configurations can be constructed where these techniques are likely to fail. Other limitations of interferometric techniques include the necessity of relative stability of the reference and test beam paths. This means that any vibration in the test instrument leads to a degradation of the measurement accuracy.

Shack-Hartmann Wavefront Sensors

A Shack-Hartmann wavefront sensor is a device that uses the fact that light travels in a straight line, to measure the wavefront of light. FIG. 2 shows a basic configuration of a Shack-Hartmann wavefront sensor 200. The Shack-Hartmann wavefront sensor 180 comprises a lenslet array 182 that breaks an incoming beam into multiple focal spots 188 falling on an optical detector 184. Typically, the optical detector 184 comprises a pixel array, for example, a charge-coupled device (CCD) camera. By sensing the positions of the focal spots 188, the propagation vector of the sampled light can be calculated for each lenslet of the lenslet array 182. The wavefront can be reconstructed from these vectors.

However, Shack-Hartmann wavefront sensors have a finite dynamic range determined by the need to associate a specific focal spot to the lenslet it represents. A typical methodology for accomplishing this is to divide the detector surface into regions (called "Areas Of Interest" [AOIs]) where the focal spot for a given lenslet is expected to fall. If the wavefront is sufficiently aberrated to cause the focal spot to fall outside this region, or not be formed at all, the wavefront is said to be out of the dynamic range of the sensor. FIG. 3 shows an example of a Shack-Hartmann wavefront sensor 300 in an out-of-range condition.

In practice Shack-Hartmann wavefront sensors have a much greater dynamic range than interferometric sensors. This range may be tens to hundreds of waves of optical path difference. However, this dynamic range is still insufficient to characterize many real optics.

Other Wavefront Sensing Technologies

Other sensors such as the Moire Deflectometer have a higher dynamic range, but lack the sensitivity necessary for accurate measurement of most transmissive optical elements.

Both optical and computational methods have been used to extend the dynamic range of wavefront sensing devices. Some example computational methods include Spot Tracking, Phase Unwrapping, and Angular Spectrum Propagator Reconstruction.

Spot Tracking

This method extends the dynamic range of the Shack-Hartmann wavefront sensor in the case where the wavefront being measured starts out within range and then drifts out of range over a period of time. This case exists for many optical configurations where a lens moves within the optical setup or a component changes optical characteristics due to some cause such as material heating or deformation. Spot tracking is accomplished by comparing current positions of focal spots to positions recorded in a previous frame. The previous positions are used as a starting point for locating the spots after an incremental movement. As long as the frames are taken frequently enough, then it is computationally simple to keep track of them. This technique has been known since at least 1993 (A. Wirth, A Jankovics, F. Landers, C. Baird, and T. Berkopec, "Final report on the testing of the CIRS telescopes using the Hartmann technique," Tech. Rep. NAS-31786, Task 013 (Adaptive Optics Associates, Cambridge, Mass. 1993)). A limitation to this approach is that the incident wavefront must start out within range.

Phase Unwrapping

In this technique the focal spot to lenslet mapping is inferred using techniques similar to those used in interferometry. This technique is described in "Dynamic range expansion of a Shack-Hartmann sensor by use of a modified unwrapping algorithm," by J. Pfund, N. Lindlein, and J. Schwider, Optical Society of America, 1998.

Angular Spectrum Propagator Reconstruction

Described by "Algorithm to increase the largest aberration that can be reconstructed from Hartmann sensor measurements," by M. Roggemann and T. Shulz, Applied Optics, Vol 37, No 20, 1998, this technique is computationally expensive and therefore inappropriate for many measurement applications.

While there are means for tracking and adjusting the positions of these AOIs (as described previously), the simplest, most robust calculations are achieved for the case where a single mapping of lenslets onto the pixels can be maintained. For example, U.S. Pat. No. 5,825,476 discloses a method that uses a missing focal spot to identify the central AOI, and then tracks all the other focal spots using this missing data. However, if there is a speck of dust on the part under test, this easily fools the identification of this missing spot, leading to inaccurate results.

U.S. Pat. No. 6,550,917, the entire contents of which are hereby incorporated by reference for all purposes as if fully set forth herein, discloses a means for extending the dynamic range of a sensor by adjusting the spherical radius of curvature of a reference sphere to match the effective defocus of the optical system under test (in that case, an eye). While a similar scheme can be applied to testing transmissive optics, the requirements for testing an eye en vivo are significantly different from those of measuring a fixed lens or optical element. For an intraocular lens, the focal length in air can be as short as 10 mm, necessitating the use of a different optical testing method.

Without some tracking scheme, the focal spot moves either completely or partially out of the assigned AOI. Thus the pixels do not accurately represent the focal spot position information. If inaccurate data is used to set the position of an adaptive focal element, then the system may not converge to the correct position, leading to an inaccurate measurement or slow convergence. In a typical embodiment, there may be thousands of potential focal spots. Thus identifying poor focal spots, or focal spots that have wandered outside of their correct AOIs, is useful for maintaining the accuracy of the subsequent calculations.

Accordingly, it would be desirable to provide a system and method for extending the dynamic range of wavefront sensing devices in transmissive optics metrology. It would also be desirable to provide a system and method for sensing and analyzing the wavefront of light passing through an optically transmissive system with enhanced dynamic range. It would be further desirable to provide such a system and method which overcomes one or more disadvantages of the prior art.

The present invention comprises a system and method for sensing and analyzing a wavefront of an optically transmissive system. By analyzing the wavefront, the system and method may ascertain desired parameters of the optically transmissive system. In particular, for example, when the optically transmissive system is a lens such as a contact lens, the system and method may accurately determine the focal length of the lens by sensing and analyzing the wavefront of light passing through the lens. Furthermore, once the focal length has been determined, the system and method may eliminate the lower order focal length term from the analysis, and determine higher order aberrations in the lens.

In one aspect of the invention, a system for sensing a wavefront of light passed through an optical device, comprises: a device under test (DUT) holder adapted to hold the optical device; a point light source adapted to provide light to the optical device; a movable platform adapted to move the point light source along an optical axis of the system; a first lens adapted to receive and pass therethrough a light beam from the optical device; a range-limiting aperture adapted to receive and pass therethrough at least a portion of the light beam from the first lens; a second lens adapted to receive and pass therethrough the portion of the light beam from the range-limiting aperture; a Shack-Hartmann wavefront sensor adapted to receive the portion of the light beam from the second lens and to produce therefrom wavefront data; and a processor adapted to receive the wavefront data from the wavefront sensor and to control movement of the movable platform to move the point light source to a location about one focal length away from the optical device.

In another aspect of the invention, a method of measuring a wavefront of light from an optically transmissive device, comprises: locating a light source a first distance from the optically transmissive device; passing light from the light source through the optically transmissive device; imaging at least a portion of the light passed through the optically transmissive device; sensing a wavefront of the imaged light to produce therefrom wavefront data; and adjusting a location of the light source with respect to the optically transmissive device to substantially maximize a degree of collimation of the light passed through the optically transmissive device.

In yet another aspect of the invention, a system for measuring a wavefront passed through an optically transmissive device, comprises: a light source disposed on a first side of an optically transmissive device; a wavefront sensor disposed on a second side of an optically transmissive device; a relay imaging system disposed between the optically transmissive device and the wavefront sensor; and means for adjusting a distance between the light source and the optically transmissive device.

In still another aspect of the invention, a method of determining a focal length of a lens comprises: (1) locating a light source a first distance from the optically transmissive device; (2) passing light from the light source through the optically transmissive device; (3) imaging at least a portion of the light passed through the optically transmissive device; (4) sensing a wavefront of the imaged light; adjusting a location of the light source with respect to the optically transmissive device to substantially maximize a degree of collimation of the light passed through the optically transmissive device; (5) moving the light source by a distance $x_i$ from the location that substantially maximizes the degree of collimation of the light passed through the optically transmissive device, where i=(1, N); (6) sensing a wavefront of the imaged light; (7) calculating a radius of curvature value of the sensed wavefront; (8) repeating the steps (5) through (7) N−1 times (where N is an integer) where the value of $x_i$ is changed each time the steps (5) through (7) are repeated; and (9) calculating the focal length of the lens from the N radii of curvature values calculated in the steps (5) though (8).

BRIEF DESCRIPTION OF THE DRAWINGS

FIG. 1 is a functional diagram of one embodiment of a wavefront analysis system according to one or more aspects of the invention;

FIG. 2 shows a basic arrangement of a Shack-Hartmann wavefront sensor;

FIG. 3 shows an out-of-range condition for a Shack-Hartmann wavefront sensor;

DETAILED DESCRIPTION

Figure 4:
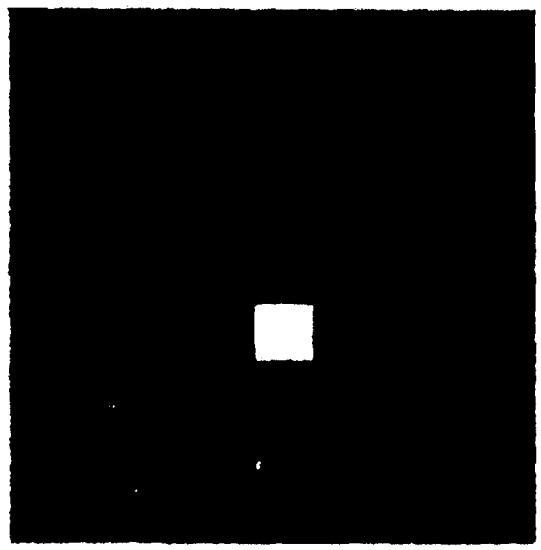
FIG. 4 shows an example area of interest (AOI) for a case where the focal spot is well within range of a lenslet.

FIG. 1 shows a functional diagram of an embodiment of wavefront analysis system 100. The wavefront analysis system 100 includes a point light source 110, a movable platform or stage 120, a system under test (SUT) holder 130, an objective lens 150, an aperture 160, an eyepiece lens 170, a wavefront sensor 180, and a processor 190.

An exemplary device under test (SUT) 140 is also shown in FIG. 1, comprising an ophthalmic lens. The SUT 140 may be any optically transmissive system or device, including but not limited to an optical component. Specific examples include a collimating lens, a contact lens, an intra-ocular lens, plate glass, a windshield, etc., or a collection of optical devices.

The point light source 110 may be a laser or laser diode, but, for example, it may also be an incandescent white light source coupled through a fiber or pin hole to form a point source, or any similar arrangement. Such a configuration has an advantage that, by adding color filters, chromatic aberrations of the SUT 140 can be measured.

In some cases it may be desirable to replace the point light source with another light source of known divergence. This would allow the measurement to be scaled to different ranges of radius or curvature. To this end additional optical elements would be added in front of the point source to provide a means for setting the divergence to a known value.

The movable platform 120 is a mechanism that allows the location of the point light source 110 to be moved relative to the SUT holder 130. The movable platform 120 may be an electromechanical stage, a stage with a micrometer, or a similar contrivance. The movable platform 120 may be manually adjusted. However, beneficially the movable platform 120 is adapted to be controlled by a feedback signal to automatically move the point light source 110 to a desired location with respect to the SUT 140, as will be described in more detail below. For example, the movable platform 120 may include a motor that transports it using rollers, wheels, along a rail, etc. Also beneficially, the movable platform 120 may be attached to a position digitizer that produces location data indicating a relative distance between the movable platform 120 and the SUT 140.

As the movable platform 120 with the point light source 110 is moved, it may be desirable to adjust the amount of light either emitted from the point light source 110, or detected by the wavefront sensor 180 (through integration time or gain control) so that the wavefront sensor 180 operates at an appropriate light level. This adjustment can be performed automatically in a closed loop control circuit, or manually if only small or occasional adjustments are needed.

The objective lens 150 and an eyepiece lens 170 form a Keplerian telescope and together form an imaging system, i.e., a relay imaging system.

Beneficially, the wavefront sensor 180 is a Shack-Hartmann wavefront sensor as shown in FIG. 1, including a lenslet array 182 producing a corresponding plurality of light spots 188 from the received light beam, and an optical detector comprising a pixel array (e.g., a CCD camera) 184 upon which the light spots 188 are focused. For each lenslet in the lenslet array 182, a subset of the pixel array 184 defines an "Area-of-Interest" (AOI). For example, where there are 1200 lenslets in the lenslet array 182, and where the pixel array 184 comprises 640 by 480 pixels, then the AOI assigned for each lenslet may be a square region of 16 by 16 pixels (256 pixels). Accordingly, characteristics of the wavefront of the received light beam may be ascertained by examining where the light spot 188 is projected in each AOI of the pixel array.

The aperture 160 is located at the inter-lens focal point of the imaging system for the selected focal power of the lenses. The aperture 160 is arranged such that it has appropriate size and shape to match the size and shape of the AOI after imaging through the optical system consisting of lens 170 and lenslet array 182 of the wavefront sensor 180. The shape of aperture 160 may be chosen as square, hexagonal, round or other convenient shape so long as it images to a region substantially the same size as the AOI for each lenslet in the lenslet array 182 of the wavefront sensor 180. Accordingly, the aperture 160 will only transmit light for a small range of input radii-of-curvature light beams. Typically, the size of the aperture 160 is such so that the system 100 is transmissive only for light beams that are very nearly collimated.

The processor 190 is adapted to receive and processes wavefront sensing data from the wavefront sensor 180. Beneficially, the processor 190 may process the wavefront sensing data and generate therefrom a feedback signal which it provides to the movable platform 120, as described in more detail below. For example, the feedback signal may be proportional to the curvature of the wavefront of the light beam received by the wavefront sensor 180. The feedback signal may be produced by an algorithm, executed by the processor 190, that determines the relative curvature of the wavefront by comparing the separation of light spots on the pixel array of the wavefront sensor 180.

The operation of the wavefront analysis system 100 will now be described.

Light from the point light source 110 is received by and passes through the SUT 140, producing a light beam. The light beam from the SUT 140 is received by the imaging system comprising the objective lens 150 and the eyepiece lens 170. The imaging system sizes the light beam appropriately for the wavefront sensor 180 and performs relay imaging, allowing the wavefront measurement to be made at the appropriate plane. The imaging system also provides an internal focus point for the aperture 160.

At least a portion of the light beam passes through the aperture 160 to the eyepiece lens 170 and therefrom to the wavefront sensor 180.

The lenslet array 182 and second lens 170 of the relay imaging telescope form an imaging system between detector array 184 and the aperture 160. Because the lens 170 is a single lens, with an aperture much greater than the individual lenslets of the lenslet array 182, a common point at the middle of aperture 160 will form an image on the detector array 184 directly behind each individual lenslet. That is, the image would form on the center of each AOI. Variations in the local wavefront slope at various locations of the SUT 140 result in a shift of the position of the focal spot at the aperture 160, and, since the system 170 and 182 act as an imaging system, also result in a position shift of the focal spots at the detector array 184. It is exactly this shift that is detected by the wavefront sensor 180 as a measure of the local wavefront slope.

The aperture 160 ensures that the wavefront received by the wavefront sensor 180 remains within the initial dynamic range of the wavefront sensor 180. For the case where local wavefront slope on the SUT 140 is irregular (either because of optical errors or due to fact that the source 110 and device under test 130 are not arranged to produce a collimated beam, that is, a planar wavefront), then the focal spots 188 will move across the detector array 184 of the wavefront sensor 180 in a pattern that corresponds to the irregular wavefront slopes. If the local wavefront slope is too great (the out-of-range condition), it will be clipped by the aperture 160 and hence not be incident upon the detector array 184. Thus, in this arrangement, the aperture 160 removes any light that otherwise would cause an out-of-range condition for the lenslet array 182 of the wavefront sensor 180.

Thus the aperture 160 serves as a range-limiting aperture, thereby limiting the dynamic range of the incident light so that the wavefront sensor 180 never receives light that would otherwise cause an out-of-range condition. Typically, the light incident at the aperture 160 creates a focal spot that is less than ten (10) times the diameter of the aperture 160 itself, although this depends upon the particular system design.

When the point light source is located far away from the optimal position, the light passing through the objective lens 150 will include components that are severely off-axis and which arrive at the plane the range-limiting aperture 160 spaced fairly far away from the internal focal point of the imaging system. Thus, these components are blocked by the range-limiting aperture 160. This insures that any out-of-range condition of the wavefront sensor 180 cannot occur.

Figure 9A:
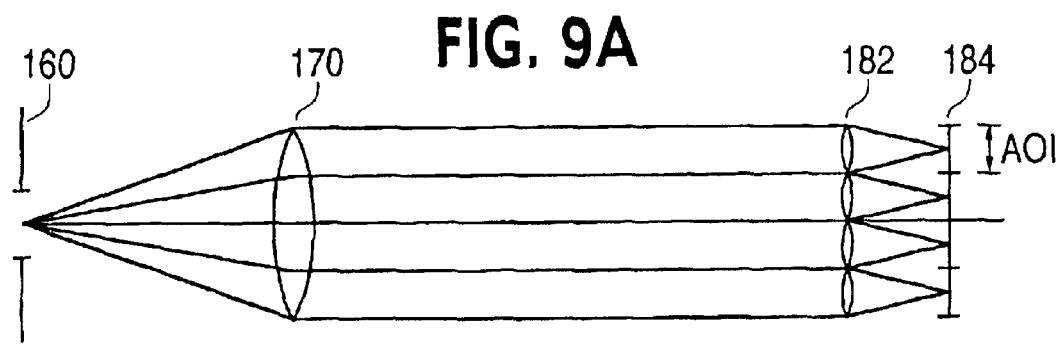
FIGS. 9A–C illustrate operation of a range-limiting aperture in conjunction with a wavefront sensor under three different conditions.
Figure 9B:
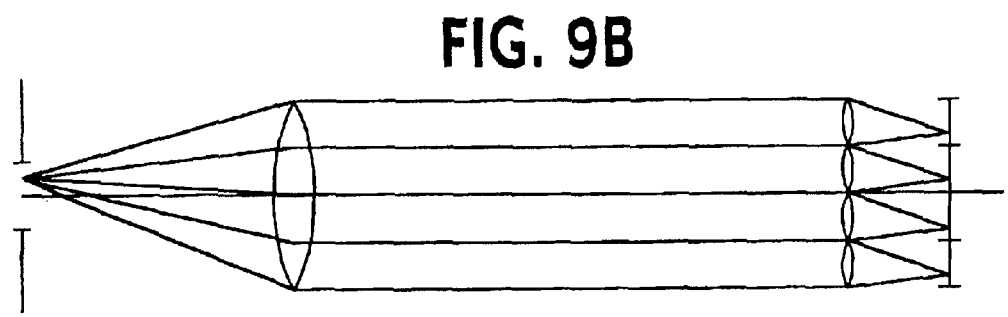
Figure 9C:
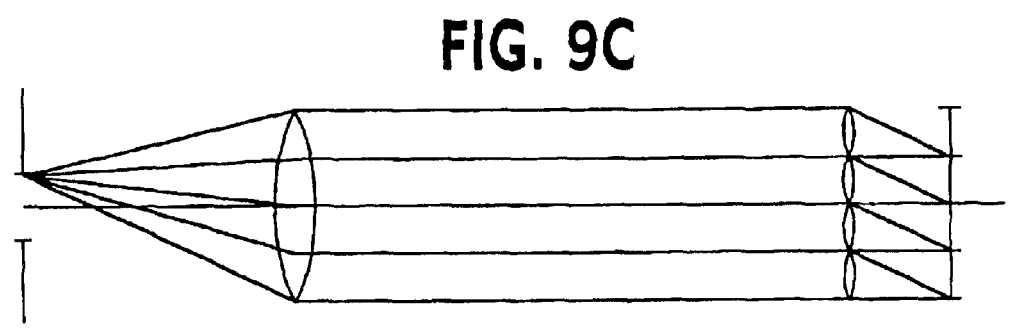

FIGS. 9A–C illustrate operation of the range-limiting aperture 160 and the wavefront sensor 180 under three different conditions. In FIG. 9A, all of the light enters through the center of the range-limiting aperture 160. FIG. 9B illustrates the case where the light enters near the edge of the range-limiting aperture 160. In that case, the light spots 188 all still resolve within a corresponding AOI at the detector array 184. FIG. 9C illustrates the case where the light enters at the edge of the range-limiting aperture 160.

Advantageously, the point light source 110 is configured so that the distance between the point light source 110 and the SUT 140 may be adjusted. Beneficially, the point light source is attached to the movable platform 120 and thereby may be moved along the optical axis of the wavefront analysis system 100.

Beneficially, when the SUT 140 is a contact lens or intra-ocular lens, for example, the wavefront analysis system 100 may be employed to determine the focal length of the SUT 140.

In the wavefront analysis system 100, the light beam provided to the wavefront sensor 180 is more or less collimated depending upon the relative location of the point light source 110 with respect to the SUT 140. When the point light source 10 is located one focal length away from the SUT 140, then the light beam from the SUT 140 will be optimally collimated. During the initial set-up, the wavefront sensor 180 and processor 190 determine the degree of collimation of the light beam produced by the point light source 110 and the SUT 140. Then, the point light source 110 is moved by the movable platform 120 until it is located at a position with respect to the SUT 140 that produces an optimal or near-optimal degree of collimation of the light beam emerging from the SUT 140.

Although the movable platform 120 may be moved manually, beneficially an electromechanical movable stage 120 is employed which operates under the control of the processor 190. In that case, the processor 190 may operate with the movable stage 120 in a feedback loop to move the point light source 110 to a location along the optical axis of the system 100 where the light beam from the SUT 140 is optimally or nearly optimally collimated. And the position of the point light source 110 may be continuously adjusted as necessary to account for any vibration or changes in temperature that may change the optimal location for the point light source 110.

The distance between the point light source 110 and the SUT 140 that produces optimal collimation of the light beam may be interpreted as the focal point (focal term) of the SUT 140.

In theory, then, once the point light source 110 is located where it produces optimal or near-optimal collimation of the light beam from the SUT 140, in theory the focal length of the SUT 140 could be determined my measuring the distance between the point light source 110 and the SUT 140. This may be done in several ways, either manually or in an automated fashion. Beneficially, the location of the point light source 110 with respect to the SUT 140 may be automatically detected from a position digitizer 125 by the processor 190.

However, such a direct measurement approach for determining the focal length of the SUT 140 suffers from inaccuracies due to a number of factors, including, e.g., the finite thickness of the contact lens/intra-ocular lens itself. In many applications, the inaccuracy of the focal length value produced by the direct measurement approach is too great.

Figure 10:
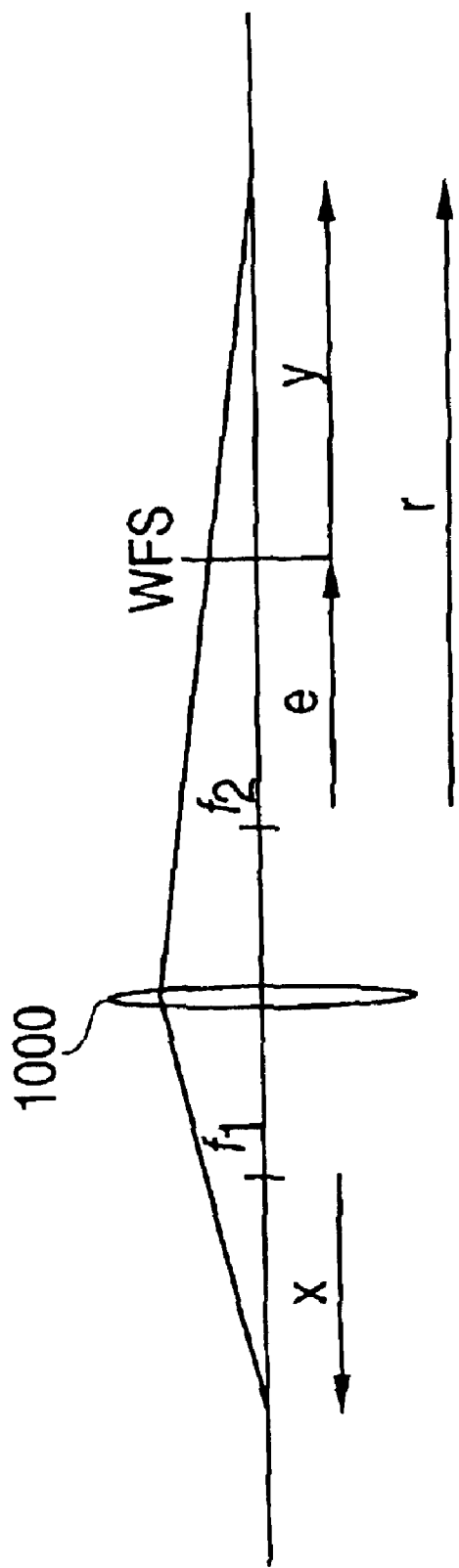
FIG. 10 is a diagram for illustrating a method of determining a focal length of a lens.

Accordingly, another method has been provided to employ the wavefront analysis system 100 to determine the focal length of the SUT 140. This method will hereafter be described with respect to FIG. 10, which shows a lens 1000, which may be the SUT 140 in FIG. 1. In FIG. 10: "$f_1$" indicates the location where a point light source should be placed such that the lens 1000 will output a fully collimated light (i.e., $f_1$ is located one focal length away from lens 1000); "x" indicates a distance between the location "$f_1$" and the location where a point light source is located; "$f_2$" indicates a location one focal length away from lens 1000 on the other side of the lens 1000 from the point light source; "e" indicates a distance between the location "$f_2$" and the location where a wavefront sensor (such as the wavefront sensor 180 of FIG. 1) is located; "r" indicates the radius of curvature of a light beam passing through lens 1000 when illuminated by a point light source placed at the location "x"; and "y" indicates a distance between the location "$f_2$" and the location where the light beam passing through the lens 1000 converges when illuminated by a point light source placed at the location "x."

In FIG. 10, when a point light source is located at a distance "x" from the first focal point "$f_1$," and a wavefront sensor is located at a distance "e" from the second focal point "$f_2$," then according to Newton's thin film formula as shown in Equation (1) below.

$$x(r+e) = -f^2 \quad \quad 1)$$

where "f"=the focal length of the lens 1000, and, as noted above, "r"=the radius of curvature of the light beam passing through the lens 1000 as measured by the wavefront sensor.

So, if "x" and "e" are known, one can solve Equation (1) for "f" by measuring "r," the radius of curvature of the light beam passing through the lens 1000, with a wavefront sensor. Furthermore, even if "e" is not known, one can solve for the two unknown variables "f" and "e" by solving Equation (1) for two different values of "x" (two different point light source locations) and "r."

Accordingly, a method for determining the focal length "f" of the lens 1000 with the wavefront analysis system 100 of FIG. 1 proceeds as follows.

First, the wavefront sensor 180 is placed an unknown distance ("e") downstream from the SUT 140 (e.g., the lens 1000).

Next, the location of "$f_1$" is determined by moving the point light source 110 via the movable platform 120 until it is located at a position with respect to the SUT 140 that produces an optimal or near-optimal degree of collimation of the light beam emerging from the SUT 140, as determined by the wavefront sensor 180. Specifically, data measured by the wavefront sensor 180 is used to calculate a radius of curvature "r" of the light beam, and the movable platform 120 is adjusted until "r" is maximized (goes toward an infinite radius of curvature, which would indicate a perfectly collimated light beam). The radius of curvature "r" of the light beam may be determined from the data detected by the wavefront sensor 180 according to a variety of algorithms. For example, the wavefront data may be used to compute the coefficients of the so-called Zernike polynomials. In that case, the radius of curvature of the light beam may be determined from equation (2) below.

$$"r" = R^2/(4 * Z_{2,0}) \quad \quad 2)$$

where R=radius of the lens 1000, and $Z_{2,0}$ is the coefficient of the (2,0) term of the Zernike polynomial.

Furthermore, an exemplary algorithm for calculating the radius of curvature "r" from the senses wavefront data is described in W. H. Southwell, "Wave-front estimation from wave-front slope measurements," J. Opt. Soc. Am., Vol. 70, No. 8, pp. 998–1006 (August 1980) "the Southwell paper," the entirety of which is hereby incorporated herein in its entirety for all purposes as if fully set forth herein.

Once the point of optimum collimation is reached, the point light source 110 is located at "$f_1$" in FIG. 10. At this point, the location "$f_1$" may be automatically detected from the position digitizer 125 by the processor 190.

Now that the location "$f_1$" has been determined, the movable stage 120 may be employed to move the point light source 110 a distance "x" from "$f_1$" and the distance "x" may be automatically detected from the position digitizer 125 by the processor 190. As the point light source 110 moves away from the focal point "$f_1$," the wavefront sensor 180 will record smaller and smaller radii of curvature "r."

Returning again to Equation (1), with the variable "x" being measured by the position digitizer 125, and the variable "r" being determined by the wavefront sensor 180, there remain only two unknown variables in Equation (1): "e" and "f" (which is the focal length; the value we wish to determine). Therefore, if the movable stage 120 is employed to move the point light source 110 to two different distances "x" from the focal point "$f_1$," and if the two different corresponding radii of curvature "r" are determined by the wavefront sensor 180, then one can simultaneously solve the Equation (1) "twice" for the two unknown variables.

Although in principle the focal length "f" can be determined by simultaneously solving Equation (1) twice for two different values or "x" and "r," employing only two measurements and solving only two equations may still limit the accuracy with which the focal length "f" is determined.

Accordingly, beneficially, the movable stage is employed to place the point light source 100 at many ("N") different distances "$x_i$" from the focal point "$f_1$," where i=(1, N). For each distance "$x_i$" where the point light source 110 is located, the wavefront sensor 180 determines the corresponding radius of curvature "$r_i$" of the light beam, where i=(1, N). Then, an algorithm is applied to the data to determine the "best fit" values for "e" and "f." Beneficially, the algorithm may be a least-squares fit algorithm, although other techniques may be employed.

Details of one exemplary least-squares best fit algorithm may be found in, "Benjamin J. Pernick et al., Least-squares technique for determining principle plane location and focal length," Applied Optics, Vol. 26, No. 15, pp. 2938–39 (August 1987), the entirety of which is hereby incorporated herein its entirety for all purposes as if fully set forth herein.

However, employing such a least-squares best fit algorithm may yield a result that is more inaccurate than is desired if the data point at "x"=0 (at the focal point "$f_1$") is employed in the algorithm. For example, Tables 1 and 2 below show some experimental results that were obtained with a lens having a focal length of 1.00±0.05 m.

TABLE 1

| x, mm | r, mm |
|---|---|
| 60 | 15782.46325 |
| 50 | 18891.13451 |
| 40 | 23960.75208 |
| 30 | 32353.13494 |
| 20 | 50591.44026 |
| 10 | 104688.7173 |
| 0 | −1839049.364 |
| −10 | −103184.3176 |
| −20 | −50736.61175 |
| −30 | −33758.93702 |
| −40 | −25711.53712 |
| −50 | −20803.82136 |
| −60 | −17466.85276 |

TABLE 2

| focal length "f" | 0.963 ± 0.009 m |
|---|---|
| offset distance "e" | 0.8 ± 100 m |

It can be seen that the computed focal length "f" is inconsistent with the expected value of 1.00±0.05 m. And while the value for the offset distance "e" is reasonable, the uncertainty (±100 m) suggests that this value is nebulous.

Accordingly, it has been discovered that a more accurate determination of the focal length "f" is produced when any data point at or very near to "x"=0 is removed from the data set prior to employing the least-mean-square fit algorithm. When the point at "x"=0 is excluded from the data set of Table 1, then the values shown below in Table 3 are obtained, instead of those in Table 2.

TABLE 3

| | |
|---|---|
| focal length "f" | 1.002 ± 0.002 m |
| offset distance "e" | 0.8 ± 8 m |

As an alternative to eliminating the points near x=0, it may be appropriate to formulate the fitting problem in terms of the dioptric power of the optical system as measured by the wavefront sensor 180. That is, instead of fitting to curves of "r" vs. "x", it would be better to fit to curves of "1/r" vs. "x". In this case the fit is not nearly so nonlinear, and a much more stable solution can be obtained.

Finally, in some cases there may be uncertainty as to the precise location "$f_1$" where the collimation of the light beam is maximized. In that case, beneficially a least-squares best fit algorithm is employed to solve for THREE unknown variables ("x," "e," and "f") instead of just two. It has been found empirically that this often yields more accurate results than when "f1" and "x" are determined by the position digitizer 125 as described above. This may be applied to either the direct fit for the radius of curvature "r", or for dioptric power "1/r".

Meanwhile, real lenses are not ideally thin. In general, the lens has a front and a back principal plane. For example, the back principal plane of the lens is located somewhere inside the material of the lens. Often, the location of the back principle plane of the lens 1000 is also a parameter of interest, which it is desired to measure with the wavefront analysis system 100.

In the above-described algorithms, the parameter "e" is also calculated. Meanwhile, the distance "K" from the wavefront sensor 180 to the back principal plane of the lens 1000 equals "e"+"$f_2$."

Accordingly, in one embodiment, the wavefront analysis system 100 includes a second camera to precisely determine a distance "J" from the wavefront sensor 180 to the physical back surface of the lens 1000. The second camera looks at the lens 1000 in a direction perpendicular to the optical axis. Knowing "K" from the algorithm described above, and knowing "J" from the second camera, one can determine the location of the back principle plane of the lens 1000 with respect to its back physical surface by subtracting "J" from "K."

The wavefront analysis system 100 may also be employed to characterize any surface irregularities and other imperfections in the SUT 140. In that case, beneficially the basic focal length term of the SUT 140 is eliminated from the aberrations of the wavefront that are measured directly by the wavefront sensor 180 by positioning the point light source 110 with respect to the SUT 140 to produce optimal collimation of the light beam detected by the wavefront sensor 180. Accordingly, after having eliminating the dominant lower-order focal length term of the SUT 140, the data from the wavefront sensor 180 may then be employed to detect the higher order or residual optical aberrations of wavefront passing through the SUT 140. Such higher-order aberration data may be employed to assess the degree of surface irregularities and imperfections in the SUT 140. Further calculations such as the point spread function (PSF), modulation transfer function (MTF), or other parameters may be derived from the wavefront data. This is important for some optical systems since standards based on other measurement methods (e.g. MTF) may be used for comparison to the wavefront data.

A principle advantage of this system 100 and the method described above is that by removing the focal term from the analysis, the effective dynamic range of the wavefront analysis system 100 may be greatly increased. Since there is a well-known trade-off between dynamic range and sensitivity in typical wavefront sensor technologies, the wavefront analysis system 100 and associated method discussed above may incorporate a more sensitive (and more accurate) wavefront sensor 180. Meanwhile, the range-limiting aperture 160 insures that there is no location of the point light source 110 that produces an out-of-range condition for the wavefront sensor 180 at any point on the detector 184. This enables the processor 190 to adjust the distance between the point light source 110 and the SUT 140 (e.g., by moving the movable platform 120), through the feedback loop in a stable manner that ensures that the process will settle with the point light source 110 at the desired distance from the SUT 140 (e.g., one focal length away).

As noted above, the range-limiting aperture 160 clips out light that would otherwise produce an out-of-range condition for the wavefront sensor 180. At the condition where the light is just beginning to clip, there is an additional effect due to diffraction around the edge of the aperture 160. This causes the image of the focal spot 188 to be non-symmetric at the detector array 184.

This can be detected by analyzing an additional property of the focal spot 188 incident on the detector array 184. The location of the focal spot 188 is usually determined by the application of a centroid or other spot locating algorithm. One algorithm is the first moment of the pixel values in the AOI. This property (location) is compared against a reference location and used to determine the spot motion and hence the local wavefront slope.

Another property that may readily be determined is the spot size. A change in the spot size, analogous to a change in position, may be used to determine if an aperture has affected the light that creates the spot. The spot size can be determined by additional analysis of the pixel values in the AOI. One useful algorithm is the $2^{nd}$ moment algorithm. That is:

$$\sigma_x^2 = \frac{\sum_{ij \in AOI} S_{ij}(x-\bar{x})^2}{\sum_{ij \in AOI} S_{ij}} \quad 3)$$

where each pixel is weighted by the square of the pixel position (relative to the center of the AOI). The signal $S_{ij}$ may be advantageously constructed from the actual pixel intensities $I_{ij}$ by thresholding, deconvolution or other method to eliminate noise and crosstalk as appropriate.

This algorithm produces a measure of the spot size in each direction (x and y). A measure of the skew or rotation can be obtained from the cross moment (x and y).

This algorithm can be advantageously applied to identify a change in the spot size as compared to a reference. To this end, the spot size (in x and y, and xy as appropriate) is determined with a reference wavefront for each AOI. This is the same reference wave that is recorded when obtaining a reference set of spot locations for use in the wavefront slope calculation. The spot size is determined for each AOI using this (or other) methods for each frame of data that is analyzed. This is compared to the reference spot sizes. A difference (may be either larger or smaller) by more than a threshold amount may be the result of light clipping on the edge of the aperture 160. Thus these AOIs have been identified, and may be removed computationally from further calculations. This operates best in conjunction with the range limited aperture 160, but may also be used by itself to identify and discard out-of-range AOIs.

FIG. 4 shows an example AOI for a 4.6 mm focal length, 0.144 mm diameter lenslet array with 9.9 $\mu$m pixels. In this case the focal spot is well within range of the lenslet, so that it lies 100% enclosed in the boundaries of the AOI.

Figure 5:
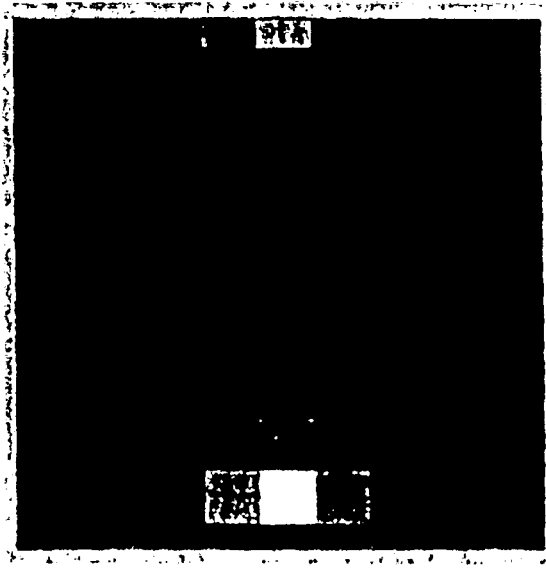
FIG. 5 shows an AOI that has light from two different lenslets.

In contrast, FIG. 5 shows an AOI that has light from two different lenslets. This will clearly give a centroid location that is in error. This is the dangerous out-of-range condition which we seek to identify and avoid. It is dangerous because the centroid algorithm will produce a centroid location that is between the two focal spots which is completely wrong. The second moment in the y-direction for this case is 10 times the second moment of FIG. 4, making this easy to identify and eliminate with this method.

Since the $2^{nd}$ moment algorithm works so well at identifying AOIs that have two (partial) focal spots, the range-limiting-aperture 160 may appear superfluous. This is not the case, however. If the local wavefront tilt is so great that the lenslet-to-AOI assignment is completely lost, such as when there is sufficient tilt for the AOI to contain the focal spot from the adjacent lenslet, the $2^{nd}$ moment would give no information. The centroid and $2^{nd}$ moment look just like in FIG. 4, but the location of the focal spot is incorrect. The use of the range limiting aperture 160 prevents this from happening, since in this case the light would be clipped by aperture 160 and the AOI would not contain any light that could lead to erroneous information.

Figure 6:
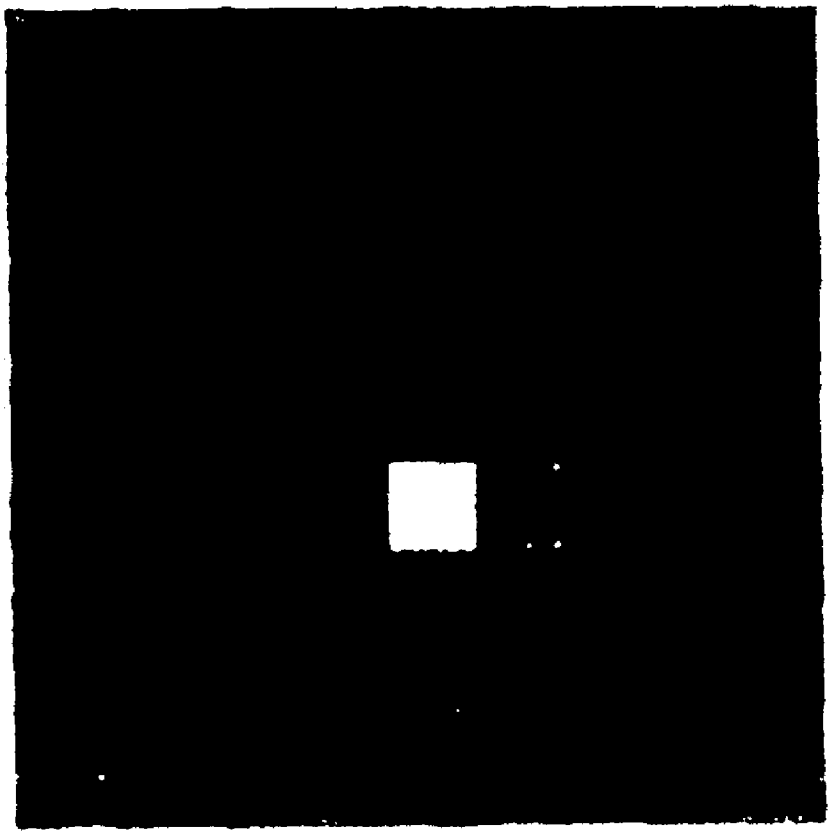
FIG. 6 shows a case where there is sufficient tilt of a light beam from a system under test that a range-limiting aperture partially occludes the focal spot.

FIG. 6 illustrates such an intermediate case. In this case, there is sufficient tilt that the focal spot is partially occluded by the range limiting aperture 160 (which was set to be slightly smaller than the AOI image in this instance). The focal spot has a distorted shape. In this case the $2^{nd}$ moment is ½ the value in the y-direction as in the x-direction. This is readily detectable by comparison with the reference, and hence even these marginal AOIs can be identified and removed from the data that is used to compute the wavefront.

Figure 7:
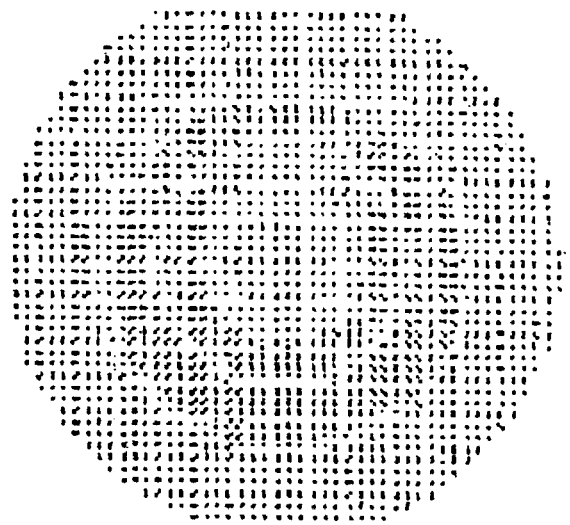
FIG. 7 shows the pattern of focal spots for a system such as that shown in FIG. 1 when a light beam emerging from the system under tests is highly collimated.

FIG. 7 shows the pattern of focal spots for a system such as that shown in FIG. 1. In this case a very complex optic was used as the SUT 140. This particular optic had different optical power in 5 different rings. In this case the range-limiting aperture 160 served to eliminate the data where the different rings intercepted. The local wavefront slope at this point was multi-valued, so no good data could be obtained. The remaining data is all completely in-range, valid data and may be used to reconstruct the wavefront to achieve accurate results.

Figure 8:
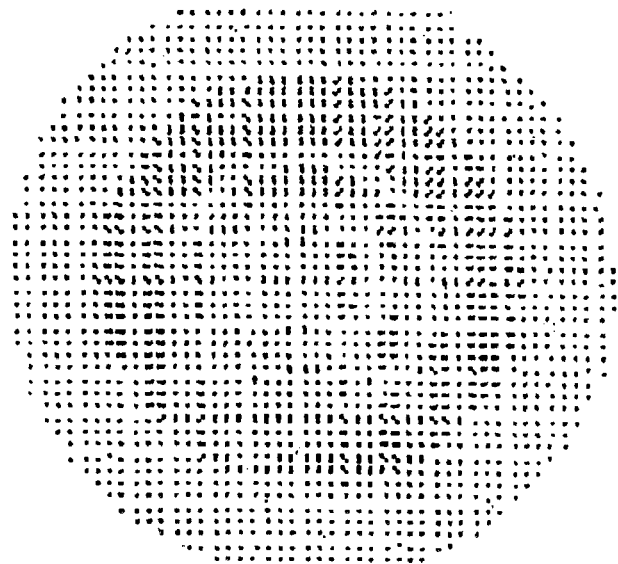
FIG. 8 shows the pattern of focal spots for a system such as that shown in FIG. 1 when a light beam emerging from the system under tests is less collimated than in FIG. 8.

FIG. 8 is the same optic as tested in FIG. 7, but with a different location of the light source 110. In this case there was significant wavefront curvature. For constant curvature, the slope increases linearly with distance from the center of the optic. So at some radial point the wavefront slope exceeds the dynamic range of the wavefront sensor 180. In this case the range limiting aperture 160 has clipped all of this light so that only the central portion remains. While this does not cover as large an area, it is more that sufficient to reconstruct the wavefront, determine the radius of curvature, and provide information feedback to set the location of the point light source 110.

In the preceding discussion, it has been assumed that the point light source 110 is located on the optical axis of the SUT 140, and furthermore that the SUT 140 is aligned perpendicularly to the optical axis of the wavefront analysis system 100 as defined by the pair of lenses 150 and 170. In some applications, it is important that the point light source 110 is located fairly precisely on the optical axis of the SUT 140, and furthermore that the SUT 140 is aligned fairly precisely perpendicularly to the optical axis of the wavefront analysis system 100.

Accordingly, in one embodiment, the movable stage 120 may be configured to not only move the point light source 110 along the optical axis (z-axis) of the wavefront analysis system 100, but also along the x-axis (side-to-side) and y-axis (up-and-down) directions with respect to the optical axis of the wavefront analysis system 100. Furthermore, the SUT holder 130 may be configured to rotate and tilt the SUT 140 with respect to the optical axis of the wavefront analysis system 100.

In that case, to adjust the point light source 110 until it is fairly precisely on-axis, the processor 190 moves the movable stage 120 between at least two different positions in the x-y directions, determines the location of the center of the light beam on the wavefront sensor 180, and, from this data, calculates how far to move the point light source 110 to place it onto the optical axis of the wavefront analysis system 100. This procedure is typically performed with an aperture installed in the SUT holder 130 instead of an optical device or lens that is to be tested. The light beam passing through the aperture placed in the SUT holder 130 produces a number of light spots (e.g., 20) on the wavefront sensor 180. By weighting each light spot and its associated location on the wavefront sensor 180, the center of the light beam can be determined, and the difference between the center of the light beam and the location and where the center should appear if the point light source 110 was on-axis (typically the center of the wavefront sensor 180) can be calculated. Alternatively, the beam center can be determined from the wavefront tilt detected by the wavefront sensor 180. This procedure can be performed in an automated manner with a closed loop feedback system including the processor 190 and the movable stage 120.

Meanwhile, to fairly precisely align the SUT 140 to be perpendicular to the optical axis of the wavefront analysis system 100, the SUT holder 130 may be rotated or tilted until the amount of astigmatism detected by the wavefront sensor 180 is minimized. The astigmatism may be found, for example, from the coefficients of the Zernike polynomial for the detected wavefront. However, other outputs of the wavefront sensor 180 may be employed to determine when the SUT 140 is perpendicular to the optical axis of the wavefront analysis system 100.

If the point light source 110 is located along the optical axis of the SUT 140, you can only determine the on-axis aberrations. For most optical systems, it is important to know both the on-axis and off-axis aberrations. This is especially important in camera lenses where good image quality is required at the corners of the image. By moving the point light source 110 off-axis with the movable stage 120, the off-axis aberrations can be determined. Because of the imaging condition between the wavefront sensor 180 and the SUT 140, the beam of light will remain on the wavefront sensor 180 even when the point light source 110 is moved off axis.

Furthermore, for some applications, it is also desired to know what effect the tip and tilt of the lens will have on the wavefront aberrations. It is especially important to measure for the tip/tilt aberrations of intra-ocular lenses that are put in the human eye after cataract surgery. Because of the large amount of variability of the structures that are found in the eyes of different people, it is hard for the surgeons to control the tip and tilt of the intra-ocular lens once it is implanted. So those kinds of lenses have to work well over a range of tip and tilt conditions. The tip/tilt wavefront aberrations can be determined by adjusting the tip and tilt of the SUT 140 by means of the SUT holder 130 in a determined pattern (e.g., under control of the processor 190) and making wavefront measurements at each tip and tilt. This SUT holder 130 may be adjusted manually, or under computer control with a motorized mount.

When the point light source 110 is located one focal length ("f") away from the SUT 140, the wavefront analysis system 100 measures the wavefront aberrations of the SUT 140 for a collimated light beam. However, many lenses, such as zoom lenses for example, are used with a variety of converging and diverging light beams. In general, the aberrations of such a lens would change as the point light source 10 moves closer to or further from the focal point of the lens (i.e., operate with converging or diverging light beams). Accordingly, it is sometimes desirable to characterize the aberrations of an SUT 140 with converging and/or diverging light beams. With the present system and method, the movable stage 120 may be moved along the optical axis (z-axis) of the wavefront analysis system 100 to pass converging or diverging light through the SUT 140, and the wavefront sensor 180 may make corresponding aberration measurements.

When an intra-ocular lens is used in an eye, it is immersed in fluid (primarily, water). The immersion changes the focal length of the lens to be about 2 to 3 times less than it is in air. In general the amount of change depends on the index of refraction of the lens material, the thickness of the lens, and the front and back shapes of the lens. It is not possible to derive a general conversion formula from air to water unless those parameters are known. So, when those parameters are not known or have a great deal of uncertainty, it is very important to be able to measure the lens when it is immersed in water. Accordingly, in one embodiment, the wavefront analysis system 100 (and particularly the SUT holder 130) is adapted to immerse the SUT 140 in water during the wavefront measurements.

There is a new generation of multi-focal intra-ocular lenses that is being implanted in patients. These lenses are needed by many patients over the age of 40 that are presbyopic. Presbyopia is the condition where people can no longer adjust the focus of their eye between near and far. Presbyopia is a normal effect of aging. The traditional solution for these people is for them to wear glasses when they want to read, or for them to have bi-focal glasses.

In the multi-focal intra-ocular lenses, the lens is designed so that different regions of the lenses have different focal lengths. The most common design is that the central circular region has one focal length, and the zone that is outside of that central region has a different focal length. In some designs, it might be that the top half of the lens has one focal length, and the bottom half has a different focal length. This is a very active area of research with a great many different types of designs being tested.

The traditional technique for measuring these sorts of lenses is to physically place apertures in front of the lens and then do the measurements. This is somewhat inconvenient as it requires making extra parts to measure the lenses, and for those parts to be properly aligned to the lenses.

Accordingly, in one embodiment of the present invention, the processor 190 operates with masks in the software that simulate the effect of physical apertures. Data in areas of the wavefront sensor 180 that is excluded by the mask(s) is not used when executing the algorithms described above for determining the focal length. Thus, for example, the focal length of the central region of a multi-focal intra-ocular lens can be first determined by masking out in software all of the wavefront data produced by the areas of the lens that are outside the central region. Then, the focal length of the outer region of the multi-focal intra-ocular lens can be determined by masking out in software all of the wavefront data produced by the areas of the lens that are inside the central region.

When the wavefront data from the wavefront sensor 180 is drawn on a display screen associated with the wavefront analysis system 100, the various regions can be outlined by a person using a mouse or pointer. But it is also possible for the processor 190 to execute a software algorithm to automatically determine where the masks should be, and for the analysis to be done separately over the different zones. Also, it possible to do optical analysis without the intermediate step of making internal masks, and instead making a zonal power map of the intra-ocular lens by using techniques that are similar to what are described in the Southwell paper, referenced above While preferred embodiments are disclosed herein, many variations are possible which remain within the concept and scope of the invention. For example, while the embodiment described above employs a movable platform to move the point light source with respect to a system or device under test, within a limited range (e.g., ±10 mm) it is possible to move the system or device under test, instead of the point light source, until the light beam emerging from the device or system is perfectly collimated. Such variations would become clear to one of ordinary skill in the art after inspection of the specification, drawings and claims herein. The invention therefore is not to be restricted except within the spirit and scope of the appended claims.

We claim:

1. A system for sensing a wavefront of light passed through an optical device, comprising:
    a device under test (DUT) holder adapted to hold the optical device;
    a point light source adapted to provide light to the optical device;
    a movable platform adapted to move the point light source with respect to the optical device;
    a first lens adapted to receive and pass therethrough a light beam from the optical device;
    a range-limiting aperture adapted to receive and pass therethrough at least a portion of the light beam from the first lens;
    a second lens adapted to receive and pass therethrough the portion of the light beam from the range-limiting aperture;
    a Shack-Hartmann wavefront sensor adapted to receive the portion of the light beam from the second lens and to produce therefrom wavefront data; and
    a processor adapted to receive the wavefront data from the wavefront sensor and to control movement of the movable platform to move the point light source to a location about one focal length away from the optical device.

2. The system of claim 1, wherein the point light source is a laser.

3. The system of claim 1, further comprising a position digitizer adapted to detect location data of the movable platform and to provide the location data to the processor.

4. The system of claim 1, wherein the optical device is an ophthalmic lens and the DUT bolder is adapted to hold the ophthalmic lens.

5. The system of claim 1, wherein the processor is adapted to determine aberrations of a wavefront of the portion of the light beam received by the wavefront sensor.

6. The system of claim 5, wherein the processor is adapted to provide a feedback signal to control movement of the movable platform.

7. The system of claim 6, wherein the processor is adapted to determine, from the wavefront data, a relative curvature of the wavefront of the portion of the light beam received by the wavefront sensor.

8. The system of claim 1 wherein the Shack-Hartmann sensor comprises:
 a lenslet array receive the portion of the light beam from the second lens and to produce a corresponding plurality of light spots therefrom; and
 a pixel array receiving the light spots from the lenslet array, the pixel array being divided into a plurality of areas of interest each having a plurality of pixels and each corresponding to one lenslet of the lenslet array.

9. The system of claim 8, wherein the range limiting aperture has a size approximately equal to a size of one of the areas of interest.

10. The system of claim 8, wherein the range limiting aperture has a shape approximately the same as a shape of one of the areas of interest.

11. A method of sensing a wavefront of light passing through an optically transmissive device, comprising:
 locating a light source a first distance from the optically transmissive device
 passing light from the light source through the optically transmissive device;
 imaging at least a portion of the light passed through the optically transmissive device;
 sensing a wavefront of the imaged light to produce therefrom wavefront data; and
 adjusting a distance between the light source and the optically transmissive device to substantially maximize a degree of collimation of the light passed through the optically transmissive device.

12. The method of claim 11, wherein adjusting the distance between the light source and the optically transmissive device comprises:
 processing the wavefront data to determine a degree of collimation of the light passed through the optically transmissive device; and
 generating therefrom a feedback signal to control movement of the light source to substantially maximize the degree of collimation of the light passed through the optically transmissive device.

13. The method of claim 12, wherein processing the wavefront data to determine a degree of collimation of the light passed through the optically transmissive device includes determining, from the wavefront data, a relative curvature of a wavefront of the light passed through the optically transmissive device.

14. The method of claim 12, wherein sensing the wavefront of the imaged light includes projecting a plurality of light spots onto a pixel array, and wherein processing the wavefront data to determine a degree of collimation of the light passed through the optically transmissive device includes determining a separation of the light spots.

15. The method of claim 12, further comprising determining a second distance between the light source and the optically transmissive device when the degree of collimation of the light passed through the optically transmissive device is substantially maximized.

16. The method of claim 11, further comprising determining a second distance between the light source and the optically transmissive device when the degree of collimation of the light passed through the optically transmissive device is substantially maximized.

17. The method of claim 11, further comprising passing the portion of the light through a range-limiting aperture.

18. The method of claim 17, wherein the wavefront of the imaged light is sensed with a Shack-Hartmann wavefront sensor.

19. The method of claim 18, wherein the range-limiting aperture is adapted to insure that the Shack-Hartmann wavefront sensor is never out of range.

20. The method of claim 18, wherein the Shack-Hartmann sensor comprises:
 a lenslet array receive the portion of the light beam from the second lens and to produce a corresponding plurality of light spots therefrom; and
 a pixel array receiving the light spots from the lenslet array, the pixel array being divided into a plurality of areas of interest each having a plurality of pixels and each corresponding to one lenslet of the lenslet array, and
 wherein the range limiting aperture has a size approximately equal to a size of one of the areas of interest.

21. The method of claim 11, wherein adjusting a distance between the light source and the optically transmissive device comprises moving the optically transmissive device.

22. A system for sensing a wavefront of light passed through an optically transmissive device, comprising: transmissive device, comprising:
 a light source disposed on a first side of an optically transmissive device;
 a wavefront sensor disposed on a second side of an optically transmissive device;
 a relay imaging system disposed between the optically transmissive device and the wavefront sensor;
 means for adjusting a distance between the light source and the optically transmissive device; and
 means for determining an optical characteristic of the optically transmissive device in response to an output from the wavefront sensor.

23. The system of claim 22, wherein the relay imaging system includes a range-limiting aperture disposed at an internal focal point between two lenses.

24. The system of claim 22, further comprising means for determining the distance between the light source and the optically transmissive device.

25. The system of claim 22 wherein the means for adjusting the distance between the light source and the optically transmissive device includes a movable platform to which the light source is attached.

26. The system of claim 25, wherein the means for adjusting the distance between the light source and the optically transmissive device further includes a processor producing a control signal for transporting the movable platform.

27. The system of claim 22 wherein the means for adjusting the distance between the light source and the optically transmissive device includes a movable platform to which optically transmissive device is attached.

28. The system of claim 22, wherein the optically transmissive device is an ophthalmic lens and wherein the system includes a holder adapted to hold the ophthalmic lens.

29. The system of claim 22, wherein the means for adjusting a distance between the light source and the optically transmissive device includes means for automatically setting the distance between the light source and the optically transmissive device equal to the focal length of the optically transmissive device.

30. The system of claim 22 wherein the light source is a laser.

31. The system of claim. 22, further comprising means for detecting a distance between the light source and the optically transmissive device.

32. The system of claim 31, wherein the means for detecting a distance between the light source and the optically transmissive device comprises a position digitizer.

33. A method of determining a focal length of a lens, comprising:
  (1) locating a light source a first distance from the optically transmissive device;
  (2) passing light from the light source through the optically transmissive device;
  (3) imaging at least a portion of the light passed through, the optically transmissive device;
  (4) sensing a wavefront of the imaged light; adjusting a location of the light source with respect to the optically transmissive device to substantially maximize a degree of collimation of the light passed through the optically transmissive device;
  (5) moving the light source by a distance $x_i$ from the location that substantially maximizes the degree of collimation of the light passed through the optically transmissive device, where i=(1, N);
  (6) sensing a wavefront of the imaged light;
  (7) calculating a radius of curvature value of the sensed wavefront;
  (8) repeating the steps (5) through (7) N−1 times (where N is an integer) where the value of $x_i$ is changed each time the steps (5) through (7) are repeated; and
  (9) calculating the focal length of the lens, from the N radii of curvature values calculated in the steps (5) though (8).

* * * * *